United States Patent [19]

Tsunoda et al.

[11] 4,218,182
[45] Aug. 19, 1980

[54] CASINGS OF HYDRAULIC MACHINES

[75] Inventors: Sachio Tsunoda; Kiyoshi Harada, both of Yokohama, Japan

[73] Assignee: Tokyo Shibaura Denki Kabushiki Kaisha, Japan

[21] Appl. No.: 949,094

[22] Filed: Oct. 6, 1978

[30] Foreign Application Priority Data

Oct. 20, 1977 [JP] Japan .................................. 52-126060

[51] Int. Cl.³ .............................................. F03B 3/02
[52] U.S. Cl. .................................................. 415/205
[58] Field of Search ............... 415/204, 205, 206, 211, 415/500, 219 B, DIG. 6

[56] References Cited

U.S. PATENT DOCUMENTS

| | | | |
|---|---|---|---|
| 2,944,786 | 7/1960 | Angell et al. ..................... | 415/205 X |
| 3,186,685 | 6/1965 | Chatfield et al. ................. | 415/205 X |

*Primary Examiner*—Leonard E. Smith
*Attorney, Agent, or Firm*—Stevens, Davis, Miller & Mosher

[57] ABSTRACT

In a casing of a hydraulic machine of the type comprising a stay ring including a pair of opposing annular plates and a plurality of stay vanes fixed therebetween to form stay vane flow passages between the stay vanes, and a spiral case disposed on the radially outside of the stay ring, the stay vane passages and the spiral case are proportioned such that the ratio n of the area $2\pi R_o B$ of a circle encircling the outer periphery of the stay vanes and the cross-sectional area $\pi R_s^2$ of the flow passage in the spiral case is from 1.9 to 2.5, and that the ratio $(R-R_o)/R_s = l$ is larger than 0.75 where $R_s$ represents the radius of the cross-section of the flow passage in the spiral case taken along a plane containing the axis of the shaft of the hydraulic machine and intersecting at right angles with the axis of an inlet to the spiral case, R the distance between the axis of the shaft and the center of the flow passage in the spiral case, $R_o$ the radius of the stay vanes to the outer periphery thereof, and B the height of the stay vane flow passages at the periphery of the stay vanes.

7 Claims, 14 Drawing Figures

F I G. 1
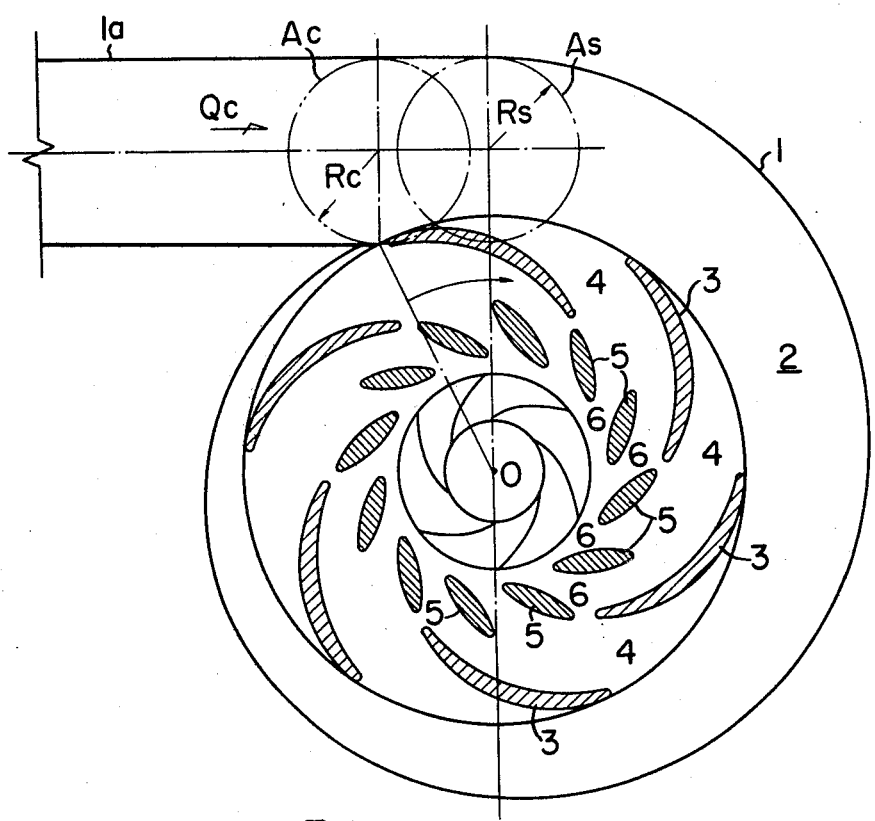
F I G. 3
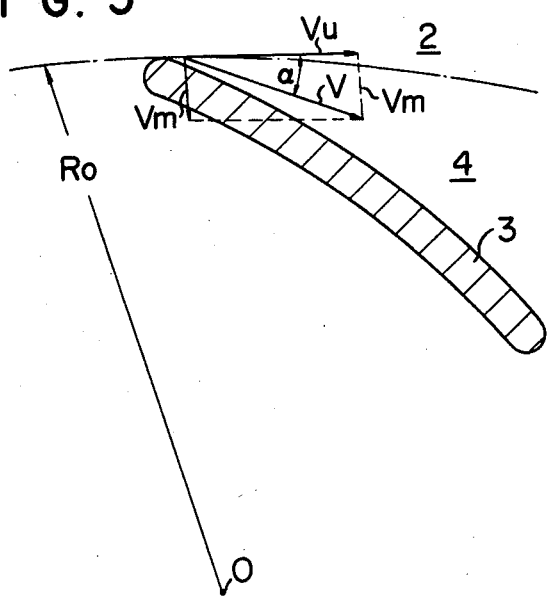

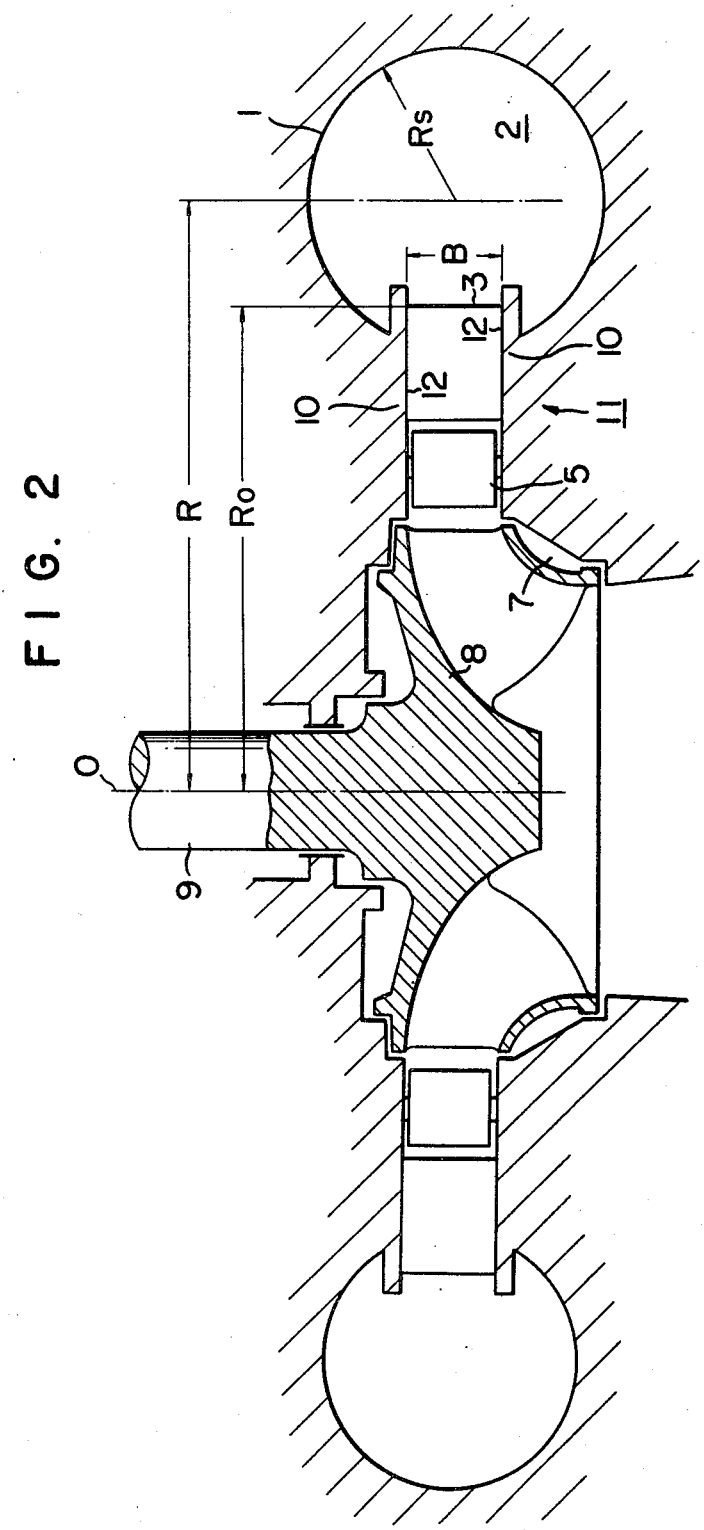

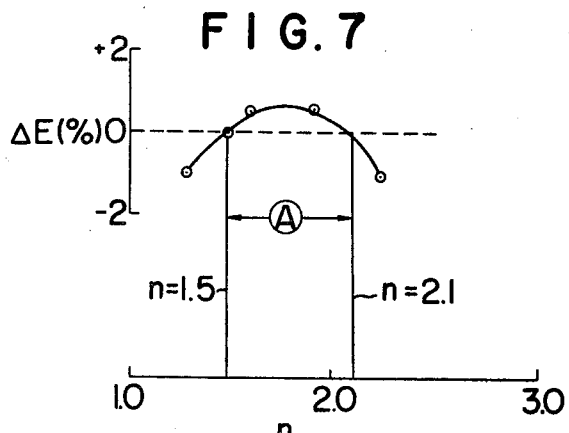
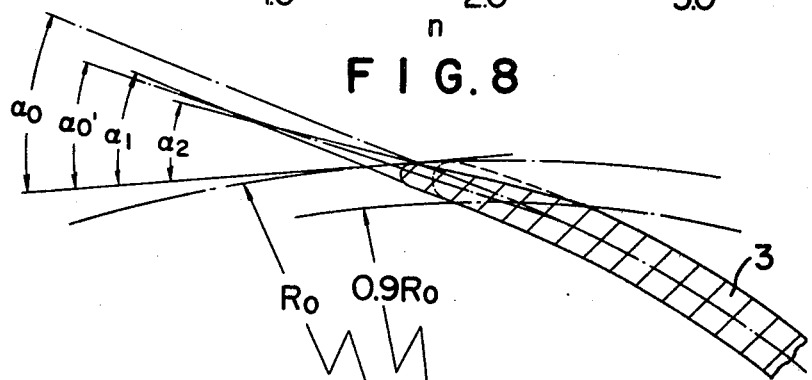

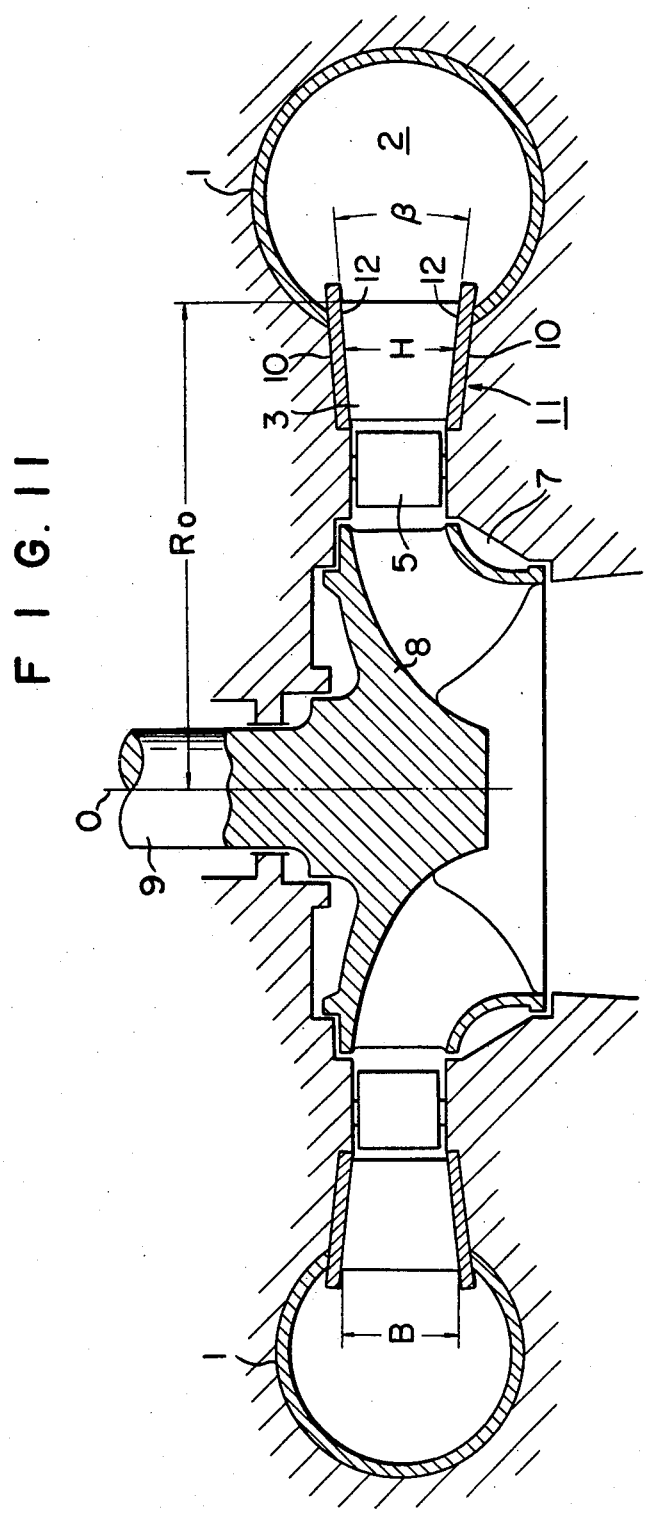

CASINGS OF HYDRAULIC MACHINES

BACKGROUND OF THE INVENTION

This invention relates to a casing of a hydraulic machine, more particularly a casing of a hydraulic machine wherein the hydraulic characteristics of the machine are improved by decreasing the size of stay vane flow passages defined between a plurality of stay vanes fixed between a pair of annular plates.

The stay ring of the casing of a modern hydraulic machine, typically a pump and a water turbine, comprises a plurality of stay vanes fixed between vertically spaced annular plates for defining a plurality of stay vane flow passages between the stay vanes.

When the hydraulic machine is operated as a water turbine, water flows from the spiral chamber of a spiral case to a runner chamber successively through the stay vane flow passages and the guide vane flow passages to rotate the runner and then discharged into a draft tube.

With the stay ring having the construction described above, however, as the cross-sectional area varies rapidly at the boundary between the spiral chamber of the spiral case and the stay vane flow passages, the velocity of the water varies when it passes through the boundary thus increasing the loss in the hydraulic head due to shock of the water flow (shock head loss). Furthermore, in the prior art casing, for the purpose of decreasing the loss in the hydraulic head caused by friction (friction head loss) which is proportional to the square of the velocity of the water flowing through the spiral case it has been the practice to design the cross-sectional area of the flow passage of the spiral case to be as large as possible. This not only increases the cost of manufacturing the spiral case but also increases the variation in the cross-sectional area at the boundary thereby increasing the shock head loss.

SUMMARY OF THE INVENTION

Accordingly, it is an object of this invention to provide an improved casing of a hydraulic machine capable of decreasing the size of the flow passages in the spiral case in which friction loss occurs and decreasing the loss caused by shock in the stay vane flow passages thereby decreasing the overall loss in the head and improving the characteristics of the hydraulic machine.

According to this invention there is provided a casing of a hydraulic machine of the type comprising a stay ring including a pair of opposing annular plates and a plurality of stay vanes fixed therebetween to form stay vane flow passages between the stay vanes, and a spiral case disposed on the outside of the stay ring, characterized in that the stay vane passage and the spiral case are proportioned such that the ratio n of the area $2\pi R_o B$ of a circle encircling the outer periphery of the stay vanes and the cross-sectional area of flow passage in the spiral case is from 1.9 to 2.5, and that the ratio $(R-R_o)/R_s = l$ is larger than 0.75 where $R_s$ represents the radius of the cross-section of the passage in the spiral case taken along a plane containing the axis of the shaft of the hydraulic machine and intersecting at right anlges with the axis of an inlet to the spiral case, R the distance between the axis of the shaft and the center of the flow passage in the spiral case, $R_o$ the radius of the stay vanes to the outer periphery thereof, and B the height of the stay vane flow passages at the periphery of the stay vanes.

BRIEF DESCRIPTION OF THE DRAWINGS

In the accompanying drawings:

FIG. 1 is a plane view showing the flow passages of water in the casing of a hydraulic machine embodying the invention:

FIG. 2 is a longitudinal sectional view showing a Francis type hydraulic machine provided with the casing shown in FIG. 1;

FIG. 3 is a vector diagram showing the velocity vector of the water flow flowing through the stay vane flow passages;

FIGS. 4 and 10 are velocity vector diagrams;

FIGS. 6 and 7 are graphs showing the relationship between said ratio n of the cross-sectional areas, and the difference in the efficiency $\Delta E(\%)$;

FIG. 8 is a cross-sectional view showing the profile of the portions of a stay vane near the periphery thereof;

FIG. 9 is a velocity vector diagram of the water flow passing through stay vane flow passages;

FIG. 11 is a longitudinal sectional view similar to FIG. 2 but showing a modified embodiment of this invention;

FIG. 12 is a graph showing the relationship between the variation in efficiency and subtend angle $\beta$;

DESCRIPTION OF THE PREFERRED EMBODIMENTS

Figure 4:
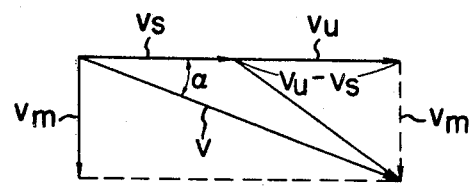

In a preferred embodiment of this invention shown in FIGS. 1 and 2, in a spiral case 1 is formed a spiral chamber 2, the cross-sectional area of the flow passage thereof gradually decreasing from the inlet side. Within the spiral case 1 are provided a plurality of stay vanes 3 which are spaced equally in the circumferential direction for defining stay vane flow passages 4 between adjacent stay vanes. A plurality of guide vanes 5 equally spaced in the circumferential direction are disposed within the stay vanes 3 to define guide vane flow passages 6 between adjacent guide vanes. Each guide vane flow passage 6 is communicated with a runner chamber 7 containing a runner 8 mounted on the lower end of a main shaft 9.

As shown in FIG. 2, the stay vanes 3 are fixed between a pair of opposing annular plates 10 to form a stay ring 11. Thus, each stay vane flow passage 4 is defined by the surfaces of adjacent stay vanes 3, and opposed inner surfaces 12 of the annular plates 10.

Let us consider the state of flow of the water flowing through the spiral chamber 2 and the stay vane flow passages 4.

Generally, the cross-sectional area of the flow passage in the spiral chamber 2 varies continuously from the inlet toward the outlet of the spiral chamber, but a typical cross-section is represented by a design cross-section $A_s$ in a plane perpendicular to the axis of an inlet pipe $1_a$ and containing the axis 0 of the main shaft 9 of the hydraulic machine. Usually, the radius $R_s$ of this cross-section is selected to be equal to the radius $R_c$ of the inlet pipe so that the area $\pi R_s^2$ of the cross-section $A_s$ is equal to the area of cross-section $A_c$. Accordingly, the velocity of the water flowing through these cross-sections is expressed by $$V_s = Q/A = Q_C/\pi R_s^2 \tag{1}$$

where $Q_c$ represents the quantity of water flow.

Let us now consider the velocity of the water flowing through the stay vane flow passages 4 by using vectors. Assume now that the water flows into the spiral chamber at a velocity of V and with an incident angle $\alpha$ with respect to the tangent to the periphery. This velocity V can be decomposed into a radial component $V_m$ extending from the spiral chamber 2 to the stay vane flow passages 4 and a peripheral component $V_u$ extending in the peripheral direction.

Since the water flows continuously, the quantity of water passing through the stay vane flow passages 4 is equal to the total quantity of water $Q_c$ flowing into the spiral chamber 2. Consequently, the radial speed component $V_m$ can be expressed as follows.

$$V_m = Q_c/2\pi R_o B \tag{2}$$

where $R_o$ represents the radius of the outer periphery of the stay vanes 3 and B the height of the stay vane flow passages at the outer periphery thereof.

The relationship between the shock head loss of the water flow in the stay vane flow passages 4 near the outer periphery thereof and the friction head loss is as follows.

As shown in FIG. 4, the component of the water velocity relating to the shock head loss near the outer periphery of the stay vane flow passages includes the radial component $V_m$ extending in the radial direction from the spiral chamber to the stay vane flow passages 4 and the relative velocity difference $V_u - V_s$ between the peripheral velocity component $V_u$ and the water velocity $V_s$ in the spiral chamber 2. Accordingly, the water velocity $V_1$ relating to the shock head loss in the stay vane flow passages 4 near the outer periphery thereof is the vector sum of the radial velocity component $V_m$ and the relative velocity difference in the peripheral direction $(V_u - V_s)$ as shown by the following equation and FIG. 4.

$$V_1^2 = V_m^2 + (V_u - V_s)^2 \tag{3}$$

Thus, the shock head loss $\Delta H_1$ is given by $$\Delta H_1 = k_1 \frac{1}{2g} V_1^2 \tag{4}$$

$$= k_1 \frac{1}{2g} \{V_m^2 + (V_u - V_s)^2\}$$

where $k_1$ represents a coefficient relating to the head loss.

As FIG. 4 shows, the relationship between $V_u$ and $V_m$ can be shown by $$V_u/V_m = \cot \alpha \tag{5}$$

From equations 1 and 2, the relationship between $V_s$ and $V_m$ can be shown by equation (6).

$$V_s/V_m = 2R_o B R_s^2 = n \tag{6}$$

where $\alpha$ represents the incident angle of the water flowing into the stay vane flow passages and n the ratio of the area $2\pi R_o B$ of a circle encircling the stay vanes and the area $A_s$ of the designed cross-section of the flow passage of the spiral chamber.

When the water flows through the spiral case 1 at a velocity $V_s$ from its inlet to its outlet a friction head loss $\Delta H_2$ which is proportional to the square $V_s$ and expressed as follows is generated.

$$\Delta H_2 = k_2 \frac{V_s^2}{2g} \tag{7}$$

where $k_2$ represents a friction loss coefficient and g the acceleration by gravity.

By substituting equations 5 and 6 into equations 4 and 7 we obtain.

$$\Delta H_1 = \{1 + (\cot \alpha - n)^2\} k_1 \frac{1}{2g} V_m^2 \tag{4'}$$

$$\Delta H_2 = n^2 k_2 \frac{1}{2g} V_m^2 \tag{7'}$$

Equation 4' shows that the shock head loss $\Delta H_1$ becomes a minimum when the area ratio n is equal to $\cot \alpha$ and that the shock head loss increases with the radius $R_s$ of the flow passage in the spiral case.

Figure 5:
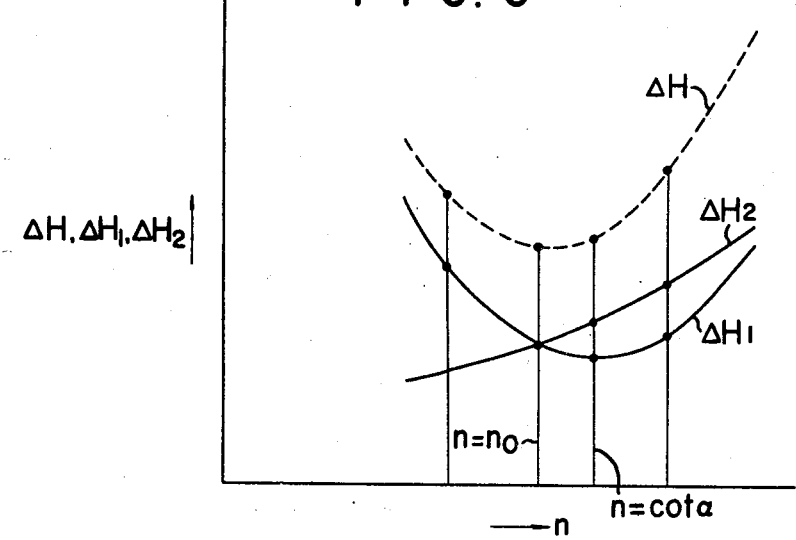
FIG. 5 is a graph showing the relationship among the ratio n between the area of a circle encircling the stay vanes and the cross-sectional area of the designed flow passage in the spiral case, shock head loss $\Delta H_1$, friction head loss $\Delta H_2$, and total head loss $\Delta H$.

FIG. 5 is a graph showing the relationship among the area ratio n, the shock head loss $\Delta H_1$, the friction head loss $\Delta H_2$ and the total head loss $\Delta H$. As can be noted from FIG. 5, even when the friction head loss $\Delta H_2$ in the spiral chamber 2 is decreased by extremely decreasing the area ratio n, as the shock head loss $\Delta H_1$ at the outer periphery of the stay vane flow passages increases, the total head loss $\Delta H$ corresponding to the sum of $\Delta H_1$ and $\Delta H_2$ can not be decreased thus impairing the efficiency of the hydraulic machine. For this reason, by designing the casing to satisfy a condition of $n = n_o$ where $\Delta H_1 = \Delta H_2$, it is possible to miniaturize the size of the flow passages and to improve the efficiency of the machine.

As above described the ratio n between the area of a circle $2\pi R_o B$ encircling the stay vanes and the area $A_s$ of the designed flow passage of the spiral case has a great influence upon the total head loss $\Delta H$.

In order to reduce the size of the casing of the machine, it is necessary to make suitable the relationship between the distance between the axis of the main shaft of the machine and the spiral chamber 2 and the distance between the axis and the outer periphery of the stay vanes. In other words, to miniaturize the casing it is advantageous to make as small as possible the difference between radius $R_o$ (see FIG. 2) to the outer periphery of the stay vanes and the radius R to the center of the designed flow passage (having a radius $R_s$) of the spiral case 1. However, when the difference between $R_o$ and R is too small, the water flowing from the inlet port to the outlet port would become turbulent due to the effect caused by the peripheral portion of the stay vanes thus not only creating local secondary flows but also decreasing the effective area of the flow passages. Consequently the water flow velocity $V_s$ is increased to increase the friction loss.

From the standpoint of the hydraulic characteristics of the machine to be described later it is advantageous to select the difference $(R-R_o)$ to be larger than 0.75 times of $R_s$.

Figure 6:
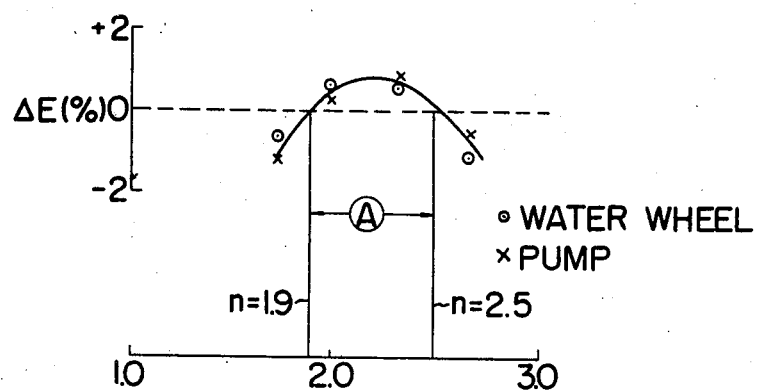

FIG. 6 is a graph showing the variation of the maximum efficiency $\Delta E(\%)$ of a Francis type pump turbine about a reference value of $n=1.9$ where the ratio $(R-R_o)/R_s$ is larger than 0.75. A shows a range in which the efficiency is increased over a case where $n=1.9$.

FIG. 7 is a graph similar to FIG. 6 showing the variation of the maximum efficiency $\Delta E(\%)$ of a Francis type water turbine about a reference value of $n=1.5$. In this case, the efficiency is improved in a range of n of from 1.5 to 2.1.

The result of our experiment made under a condition in which the ratio $(R-R_o)/R_s$ was selected to be larger than 0.75 showed that it is advantageous to construct the casing by selecting the area ratio in a range of 1.9 to 2.5 for Francis type pump turbines whereas in a range of 1.5 to 2.1 for Francis type turbines or propeller water turbines.

A method of miniaturizing the casing of a hydraulic machine from the standpoint of the stay vane angle will be described hereunder with reference to FIGS. 8 and 9.

It is possible to miniaturize the casing by decreasing the length of a stay vane 3 by increasing the stay vane angle $\alpha_o$ between a tangent to the outer periphery of the stay vane and the center line of the vane 3 so as to increase the inclination angle thereof, as shown in FIG. 8. With this construction, however, the peripheral velocity component $V_u$ of the velocity V of the incomming water flow becomes smaller than the water velocity $V_s$ in the spiral chamber 2 as shown by a solid line in FIG. 9. As can be noted from this figure, when the incident angle $\alpha$ of the water flow is reduced to $\alpha'$ it is possible to reduce the shock loss speed component from $V_1$ to $V'_1$ thereby decreasing the shock head loss $\Delta H_1$ to improve the efficiency.

In FIG. 8, $\alpha_2$ and $\alpha_1$ represent the angles between the tangent to the outer periphery of the stay vanes and the outer and inner surfaces of the outer tip of one vane 3. Thus, the outer tip is made to be unsymmetrical so that angle $\alpha_2$ is smaller than angle $\alpha_1$ thus decreasing the stay vane angle from $\alpha_o$ to $\alpha'_o$.

In the parallel type stay vane flow passages, the outer tip of the stay vane 3 extending between the outer end and a radial position of 0.9 $R_o$ is made asymmetrical as above described.

In a spiral case wherein the cross-section of the flow passage therein is made large so as to decrease the friction head loss $\Delta H_2$, the shock head loss $\Delta H_1$ near the outer periphery of the stay vane flow passages can be decreased by selecting the area ratio n in an optimum range described above so as to decrease the radial speed component $V_m$ of the water flow to $V'_m$ as shown in FIG. 10. Accordingly, the velocity components V and $V_u$ are decreased to $V'_1$ and $V'_u$ respectively with the result that water velocity $V_1$ contributing to the shock head loss is decreased to $V'_1$ from $V_1$. As can be noted from equation 4, this decreases the shock head loss $\Delta H_1$, thus improving the efficiency.

In the case of the parallel type flow passages as shown in FIG. 2, as can be noted from equation 2, in order to decrease the radial velocity component from $V_m$ to $V'_m$ is necessary to increase the outer radius $R_o$ of the stay vanes or to increase the width of the stay vane flow passages. However, this increases the size of the hydraulic machine.

In this case, as shown in FIG. 11, when the cross-sectional area of the outer periphery of the stay vanes is increased by gradually increasing the height H of the stay vane flow passage from the inner periphery toward the outer periphery, it is possible to connect the vane flow passage to the casing flow passage while maintaining the optimum area ratio n but without increasing the overall size of the stay vane flow passages, thereby improving the efficiency.

FIG. 12 shows the relationship between subtend angle $\beta$(defined hereinafter) and the variation in the maximum efficiency $\Delta E(\%)$ from that of the parallel stay vane flow passages, where the subtend angle $\beta$ between the inner surfaces of two opposing annular plates is less than 6° the flow passages are equivalent to the parallel type stay vane flow passages, whereby it is impossible to improve the efficiency. When the subtend angle $\beta$ exceeds 20° the stay vane flow passages 4 are much larger than the guide vane flow passages 6 so that the hydraulic loss caused by the separation of the water from the wall near the outer periphery of the guide vane flow passages increases thus imparing the efficiency. For this reason, the optimum range of the subtend angle $\beta$ is from 6° to 20°.

In the embodiment shown in FIG. 11, the spacing between the opposing inner surfaces 12 of the annular plates 10, that is the height H of the stay vane flow passages 4 is gradually increased from the inner periphery toward the outer periphery. Thus, the opposing inner surfaces 12 correspond to side surfaces of a frustum of cone and the angle $\beta$ subtended by these surfaces is selected to be in a range of 6° to 20°.

The opposing inner surfaces 12 are not limited to the side surfaces of a frustum of a cone but they may be side surfaces of any polygonal frustum.

Figure 13:
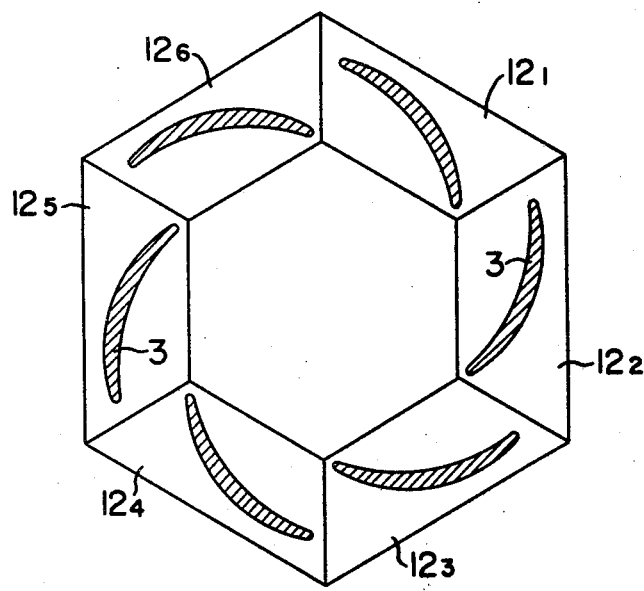
FIG. 13 is a plane view, partly in section, showing one example of the arrangement of the stay ring and stay vanes of a hydraulic turbine casing embodying the invention.
Figure 14:
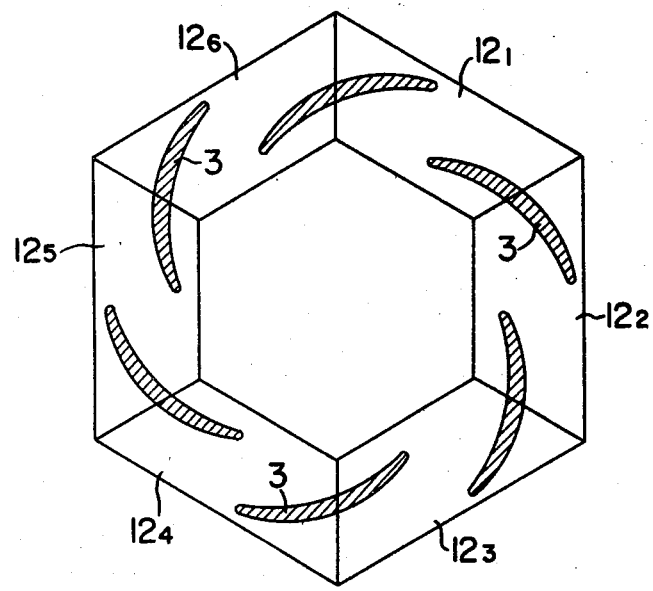
FIG. 14 is a plane view similar to FIG. 13 but showing another arrangement of the stay ring and the stay vanes.

In the embodiments, shown in FIGS. 13 and 14, hexagonal frustums are shown each comprising six flat sections $12_1$ through $12_6$ which are connected to form an annulus. In these embodiments too, the subtend angle between two opposing annuluses is selected to be $\beta=6°$ to 20° as in the previous embodiment. The stay vanes 3 may be arranged such that each stay vane is included in one section as shown in FIG. 13 or included in two adjacent sections as shown in FIG. 14.

As above described, according to this invention, the relationship between the radius $R_o$ from the axis of the hydraulic machine to the outer periphery of the stay vanes and the distance R between the axis and the center of the flow passage in the spiral chamber, and the ratio between the area of a circle encircling the stay vanes and the area of the designed flow passage of the spiral chamber are selected to be in optimum ranges for the purpose of decreasing the hydraulic loss of the water flowing through the casing and decreasing the size thereof.

Furthermore, according to this invention, the distance between a pair of opposing inner surfaces of the annular plates which fix therebetween a plurality of stay vanes, that is the height of the stay vane flow passages is increased gradually in the radial direction so that it is possible to decrease the shock loss of the water flow and to increase the efficiency.

We claim:

1. In a casing of a hydraulic machine forming a turbine of the type comprising a stay ring including a pair of opposing annular plates and a plurality of stay vanes fixed therebetween to form stay vane flow passages between said stay vanes, and a spiral case disposed on the radially outside of said stay ring, the improvement wherein said stay vane passages and said spiral case are proportioned such that the ratio of n of the area $2\pi R_o B$ of a circle encircling the outer periphery of said stay vanes and the cross-sectional area $\pi R_s^2$ of the flow passage in said spiral case is from 1.5 to 2.1, and that the ratio $(R-R_o)/R_s = l$ is larger than 0.75 where $R_s$ represents the radius of the cross-section of the flow passage in said spiral case taken along a plane containing the axis of the shaft of said hydraulic machine and intersecting at right angles with the axis of an inlet to said spiral case, R the distance between the axis of said shaft and the center of said flow passage in said spiral case, $R_o$ the radius of said stay vanes to the outer periphery thereof, and B the height of the stay vane flow passages at the periphery of said stay vanes.

2. In a casing of a hydraulic machine forming a pump turbine of the type comprising a stay ring including a pair of opposing annular plates and a plurality of stay vanes fixed therebetween to form stay vane flow passages between said stay vanes, and a spiral case disposed on the radially outside of said stay ring, the improvement wherein said stay vane passages and said spiral case are proportioned such that the ratio n of the area $2\pi R_o B$ of a circle encircling the outer periphery of said stay vanes and the cross-sectional area $\pi R_s^2$ of the flow passage in said spiral case is from 1.9 to 2.5, and that the ratio $(R-R_o)/R_s = l$ is larger than 0.75 where $R_s$ represents the radius of the cross-section of the flow passage in said spiral case taken along a plane containing the axis of the shaft of said hydraulic machine and intersecting at right angles with the axis of an inlet to said spiral case, R the distance between the axis of said shaft and the center of said flow passage in said spiral case, $R_o$ the radius of said stay vanes to the outer periphery thereof, and B the height of the stay vane flow passages at the periphery of said stay vanes.

3. The hydraulic machine according to claim 1 wherein the profile of each stay vane at portions between its outer edge and a position at $0.9\ R_o$ is made asymmetrical so that an angle $\alpha_2$ between the outer surface of said portions and a tangent to said circle encircling said stay vanes is smaller than an angle $\alpha_1$ between the inner surface of said portions and said tangent.

4. The hydraulic machine according to claim 1 wherein the distance between said opposing annular plates increases gradually from the inner periphery toward the outer periphery of said stay vanes.

5. The hydraulic machine according to claim 4 wherein the angle substended by opposing inner surfaces of said annular plates is selected to be in a range of from 6°–20°.

6. The hydraulic machine according to claim 4 wherein the opposing inner surfaces of said annular plates are defined by a frustum of a cone.

7. The hydraulic machine according to claim 4 wherein the opposing inner surfaces of said annular plates are defined by a frustum of a pyramid.

* * * * *